United States Patent
Feng et al.

(10) Patent No.: US 9,710,137 B2
(45) Date of Patent: Jul. 18, 2017

(54) HANDEDNESS DETECTION

(71) Applicant: Lenovo (Singapore) Pte. Ltd., Singapore (SG)

(72) Inventors: Xin Feng, Morrisville, NC (US); Scott Edwards Kelso, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/332,659

(22) Filed: Jul. 16, 2014

(65) Prior Publication Data
US 2016/0018960 A1 Jan. 21, 2016

(51) Int. Cl.
*G06K 7/10* (2006.01)
*G06F 3/0484* (2013.01)
*G06F 3/0488* (2013.01)

(52) U.S. Cl.
CPC ........ *G06F 3/0484* (2013.01); *G06F 3/04883* (2013.01)

(58) Field of Classification Search
CPC .... G06F 3/04883; G06F 3/017; G06F 3/0488; G06F 3/0416; G06F 3/0481; G06F 3/03543; G06F 3/03547; G06K 9/00355; G06K 9/00335; G06K 9/00375
USPC ............. 235/472.01; 715/744, 746
See application file for complete search history.

(56) References Cited

U.S. PATENT DOCUMENTS

| | | | | |
|---|---|---|---|---|
| 9,411,503 | B2* | 8/2016 | Ikeda | G06F 3/04883 |
| 2013/0278554 | A1* | 10/2013 | Ide | G06F 3/044 345/174 |
| 2014/0082514 | A1* | 3/2014 | Sivaraman et al. | 715/745 |
| 2014/0085220 | A1* | 3/2014 | Gossweiler et al. | 345/173 |
| 2014/0362002 | A1* | 12/2014 | Nakasu et al. | 345/173 |
| 2015/0074585 | A1* | 3/2015 | Lee et al. | 715/773 |
| 2015/0123891 | A1* | 5/2015 | Tu et al. | 345/156 |
| 2015/0346994 | A1* | 12/2015 | Chanyontpatanakul | G06F 3/04883 715/828 |
| 2016/0054904 | A1* | 2/2016 | Xia | G06F 3/0482 715/764 |

OTHER PUBLICATIONS

Johnston et al., "Nature's Experiment? Handedness and Early Childhood Development", Demography. May 2009; 46 (2): 281-301 (21 pages).
Williams, "Handedness Inventories: Edinburgh Versus Annett", Neuropsychology, 1991, vol. 5, No. 1, 43-48 (6 pages).
Microsoft, Windows Help, "Change mouse settings", http://windows.microsoft.com/en-us/windows/change-mouse-settings#1TC=windows-7, 2014 (2 pages).

* cited by examiner

*Primary Examiner* — Thien M Le
*Assistant Examiner* — April Taylor
(74) *Attorney, Agent, or Firm* — Brian J. Pangrle (57) ABSTRACT

A method can include receiving information via a touch-sensitive user interface; analyzing at least a portion of the information to determine a hand preference; and controlling a graphical user interface based at least in part on the determined hand preference.

21 Claims, 9 Drawing Sheets

HANDEDNESS DETECTION

TECHNICAL FIELD

Subject matter disclosed herein generally relates to handedness detection.

BACKGROUND

A user of an information handling device may be right handed (e.g., right hand dominant), left handed (e.g., left hand dominant) or ambidextrous (e.g., some degree of versatility with each hand).

SUMMARY

A method can include receiving information via a touch-sensitive user interface; analyzing at least a portion of the information to determine a hand preference; and controlling a graphical user interface based at least in part on the determined hand preference. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

An information handing device can include a processor and memory accessible to the processor. As an example, a processor may include one or more cores and, for example, an information handling device may include multiple processors.

As an example, an information handling device may include one or more controllers (e.g., microcontrollers, etc.) that may be associated with, for example, one or more hardware components. As an example, an information handling device may include firmware stored memory that provides for establishing a firmware environment for execution of instructions.

An information handing device can include operating system instructions stored in memory that provide for establishing an operating system environment for execution of instructions such as, for example, application instructions. As an example, an operating system may specify one or more application programming interfaces (APIs). As an example, an API may provide services such as base services (e.g., for file systems, components, processes, threads, error handling, etc.), advanced services (e.g., for registry, shutdown/restart, abort, start/stop/create a service, manage user accounts, etc.), graphics interface services (e.g., for outputting graphical content to monitors, printers, other output devices, etc.), user interface services (e.g., to create and manage screen windows and controls, such as buttons and scrollbars, receive mouse input, keyboard input, touch input, etc.), dialog box library services (e.g., for dialog boxes for opening and saving files, choosing color and font, etc.), control library services (e.g., for status bars, progress bars, toolbars, tabs, etc.), shell services (e.g., for access to functionality provided by an operating system shell and/or to change and/or enhance it, etc.), network services (e.g., for various networking capabilities of an operating system etc.), etc. As an example, an information handling device may optionally include operating system instructions for more than one operating system.

An information handling device may include various parameters that cause one or more components, applications, etc. to operate in a right hand mode or a left hand mode. As an example, such parameters may be set by default for operation in a right hand mode as right-handedness is most common in humans. For example, estimates indicate that about 70 percent to about 90 percent of individuals are right handed, about 10 percent of individuals are left handed and about 30 percent are mixed handed. As to mixed handed individuals, some may prefer one or more operations associated with an information handling device to be performed in a left hand mode; whereas, other mixed handed individuals may prefer those same one or more operations to be performed in a right hand mode. Accordingly, in general, it may not be possible to know user preferences with certainty a priori. And, for various reasons, a user may switch her preferences at one or more points in time. For example, if a user injures a hand, an arm, a shoulder, etc., that user may change how he interacts with an information handling device.

As an example, by default, an operating system (OS) may be setup via one or more parameter values for right handed usage. Such an OS may include a user interface (e.g., a graphical user interface or GUI) that allows a user to specify handedness, for example, to optimize settings for a left handed user. For example, consider: a mouse button on a touchpad that can be switched between a primary click and secondary click (e.g., via a parameter value); a menu that can be switched to be displayed towards right side of a display (e.g., optimized for a left handed user's view); a user interface (e.g., GUI) layout that can be switched to facilitate usage by a left handed user; a pen setting (e.g. offset, etc.) that can be switched to facilitate use of the pen for associated input by a left handed user; etc.

An operating system may include handedness-related settings (e.g., parameters) buried at some level within a hierarchy. For example, to manually change such settings, a user may need to navigate various interfaces, buttons, etc. And, settings may be buried along different branches (e.g., a display setting branch, a touchpad setting branch, a pen setting branch, etc.). User awareness of availability of such settings, branches, etc. may be poor. For example, a user may not even realize that one or more particular settings exist to optimize user experience with respect to handedness.

As an example, an information handling device can include circuitry that analyzes input to assess handedness of a user. As an example, such circuitry may determine a probability that a user is left handed or right handed or, for example, mixed handed (e.g., optionally a degree of mixed handedness with preference as to right handedness or left handedness). In such an example, where a probability is greater than a threshold, the circuitry may control a graphical user interface that can be rendered to a display to indicate, for example, that one or more settings may be changed to enhance user experience (e.g., to change one or more settings to implement one or more left handed modes, etc.). As an example, circuitry may control a graphical user interface that can be rendered to a display where a graphic control may be selected to change one or more settings to implement one or more left handed modes. For example, consider a button as a control graphic that is selectable to issue an instruction to change one or more settings.

Figure 1:
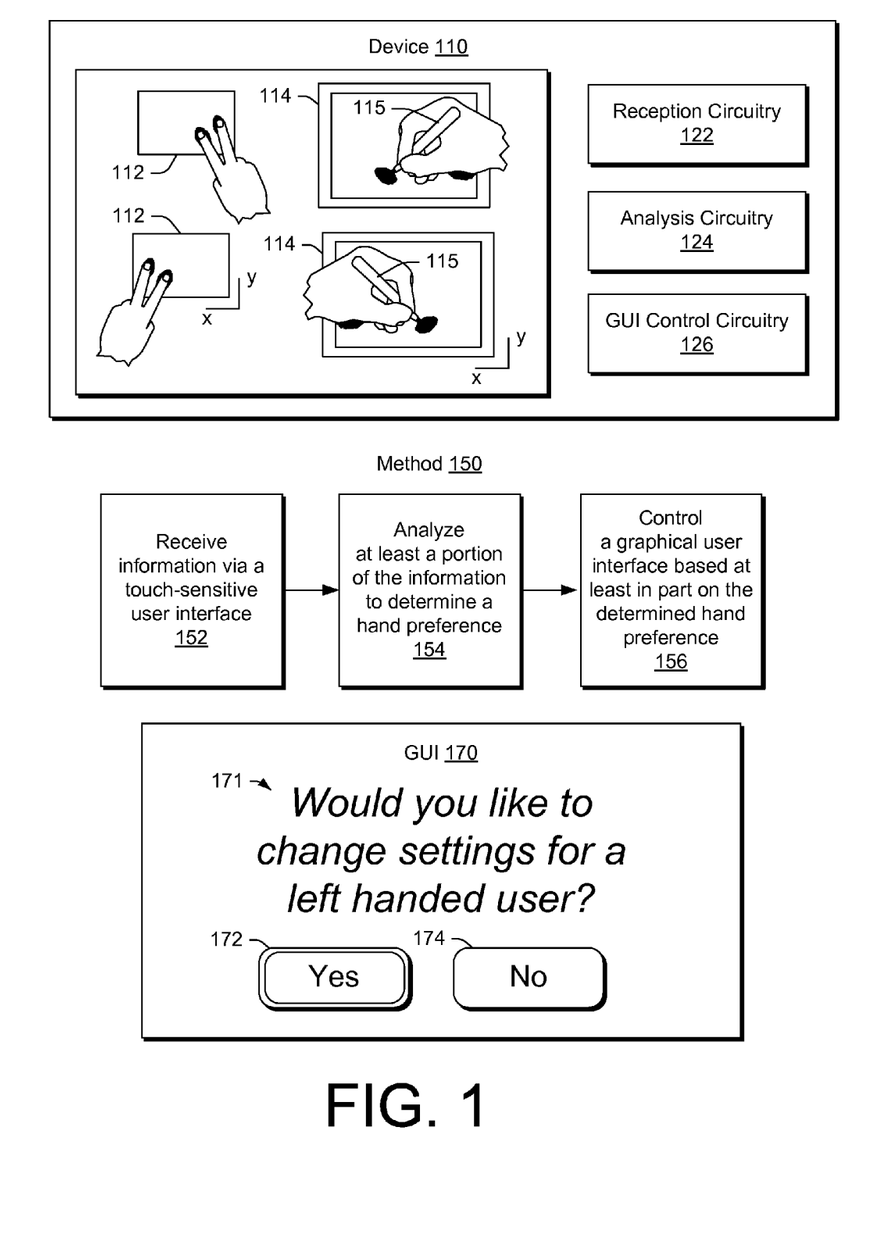
FIG. 1 is a series of diagrams of examples of a device, a method and a graphical user interface.

FIG. 1 shows an example of a device 110, such as an information handling device, an example of a method 150 and an example of a GUI 170. As shown, the device 110 can include a touchpad 112, a touch screen 114 or other touch sensitive surface. As an example, the touch screen 114 may be configured for pen input via a pen 115 (e.g., a stylus, etc.). For example, the touch screen 114 may include circuitry that can sense human touch and pen touch (e.g., object touch). In such an example, where a user uses a pen, a portion of the user's hand may be sensed. To account for such input, the device 110 may include one or more algorithms such as, for example, a palm rejection algorithm that can "block" unintended input (e.g., to not interfere with intended input, etc.).

As shown in the example of FIG. 1, the device 110 can include reception circuitry 122 for receiving information, analysis circuitry 124 for analyzing at least a portion of the information and GUI control circuitry 126 for controlling a GUI based at least in part on an analysis. As an example, the reception circuitry 122 can receive information via a touch-sensitive user interface, the analysis circuitry 124 can analyze at least a portion of the information to determine a hand preference, and the control circuitry 126 can control rendering of a graphical user interface to a display based at least in part on the determined hand preference.

As shown, the method 150 can include a reception block 152 for receiving information via a touch-sensitive user interface, an analysis block 154 for analyzing at least a portion of the information to determine a hand preference and a control block 156 for controlling a graphical user interface based at least in part on the determined hand preference. As an example, the device 110 can include the circuitry 122, 124 and 126 to implement the method 150.

As an example, a method may include controlling a graphical user interface (GUI) such as the GUI 170. For example, the GUI 170 may be rendered to a display responsive to an analysis that determines a hand preference. As shown in the example of FIG. 1, the GUI 170 includes a text field 171 (e.g., "Would you like to change settings for a left handed user?") and one or more graphical controls 172 and 174. As shown, the graphical control 172 may be an assent button (e.g., "Yes", "OK", etc.), which may optionally be selected via receipt of a carriage return key instruction (e.g., depression of an "enter" key, a touch input for enter, etc.). As an example, where a display is a touch screen, a user may touch the graphical control 172 where a device senses the touch and responsive to sensing the touch issues an instruction to change one or more settings. As an example, where a display is a touch screen configured for pen input, a user may direct a pen to the graphical control 172 where a device senses the pen and responsive to sensing the pen issues an instruction to change one or more settings. As an example, a device may receive input via one or more sensing mechanisms (e.g., keys, a touch-sensitive surface, an active digitizer, a microphone, etc.).

As to the method 150, as an example, the reception block 152 and the analysis block 154 may operate over a period of time. For example, upon an initial start-up of a device (e.g., after un-boxing), the reception block 152 and/or the analysis block 154 may operate as background operations (e.g., per instructions stored in memory of the device). After some period of use, the analysis block 154 may determine that a hand preference exists for the user. In such an example, where the hand preference differs from a default handedness mode (e.g., current settings), the method 150 may proceed to the control block 156.

As an example, a period of time, a number of uses, a number of touches, etc. may be set or used in making an analysis to determine hand preference. As an example, one or more statistical techniques may be implemented. For example, consider implementation of a technique that includes a confidence level parameter. In such an example, confidence intervals may be constructed across separate analyses of repeated (e.g., possibly different) "experiments" where the proportion of such intervals that include a "true" value of the parameter will match the confidence level. Accordingly, a method can include receiving information as associated with separate inputs and analyzing the information until a confidence level is reached for handedness being left handed (e.g., no right handed). As an example, a method may analyze information for right handedness and where a confidence level is not obtainable over repeated inputs for right handedness, a determination may be made that a user is left handed (e.g., left hand preference).

As an example, a statistical analysis may include calculations to make one or more determinations as to, and/or based on, probability and/or likelihood. Probability may be defined as the chance that a particular event (e.g., or set of events) will occur, for example, expressed on a linear scale from 0 (impossibility) to 1 (certainty) or, for example, expressed as a percentage between 0 percent and 100 percent. Likelihood may be defined as the hypothetical probability that an event that has already occurred would yield a specific outcome. As an example, a determination as to hand preference of a user may consider a probability of a right hand preference, a probability of a left hand preference and/or a probability of mixed hand preference (e.g., a chance or chances of a class or classes of hand preference). As an example, a method may include analyzing information received via one or more input mechanisms of a device (e.g., over a period of time, uses, etc.) and, depending on at least one statistic, include calling for rendering of a GUI to a display that can change one or more settings of the device in an effort to enhance user experience with respect to a determined hand preference.

As an example of a handedness determination, consider an examination that may be performed to determine a hand preference. In such an example, an individual may be asked to write (e.g., words and sentences) and draw (e.g., a variety of pictures) where observations are recorded as to whether the individual used his/her right hand, left hand, or both hands (e.g., mixed-handed). A study by Johnston et al., "Nature's Experiment? Handedness and Early Childhood Development", Demography. May 2009; 46(2): 281-301, which is incorporated by reference herein, reported that "hand preference for using a pencil or pen provides a relatively accurate categorization of an individual's hand preference". As an example, an input mechanism such as, for example, the touch screen 114 as configured for pen input via a pen 115 and touch input via a portion of a hand, may provide information that can be analyzed to determine a hand preference of a user (see, e.g., FIG. 4 and FIG. 5). In such an example, "machine observations" may be analyzed to automatically determine a hand preference (e.g., handedness detection) and, for example, automatically render a GUI to a display (e.g., depending at least in part on the hand preference). As an example, hand preference may be determined using one or more statistical techniques as in, for example, a handedness inventory (see, e.g., Williams, "Handedness Inventories: Edinburgh Versus Annett", Neuropsychology, 1991, Vol. 5, No. 1, 43-48, which is incorporated by reference herein).

As an example, a method may include analyzing received information for a series of inputs and, based at least in part on the analyzing, classifying individual inputs as being associated with an outcome (e.g., right handed or left handed). In such an example, where the percentage of outcomes for left handed (e.g., as to a total number of outcomes) exceeds a threshold, the method may include controlling a graphical user interface (GUI) by calling for rendering of the GUI to a display where the GUI can issue an instruction to change one or more settings to enhance user experience for a left handed user. As an example, a method may include an outcome parameter such that a number of outcomes are to occur before rendering a GUI to a display where the number of outcomes may be based in statistics (e.g., consider a number of outcomes as associated with confidence).

Figure 2:
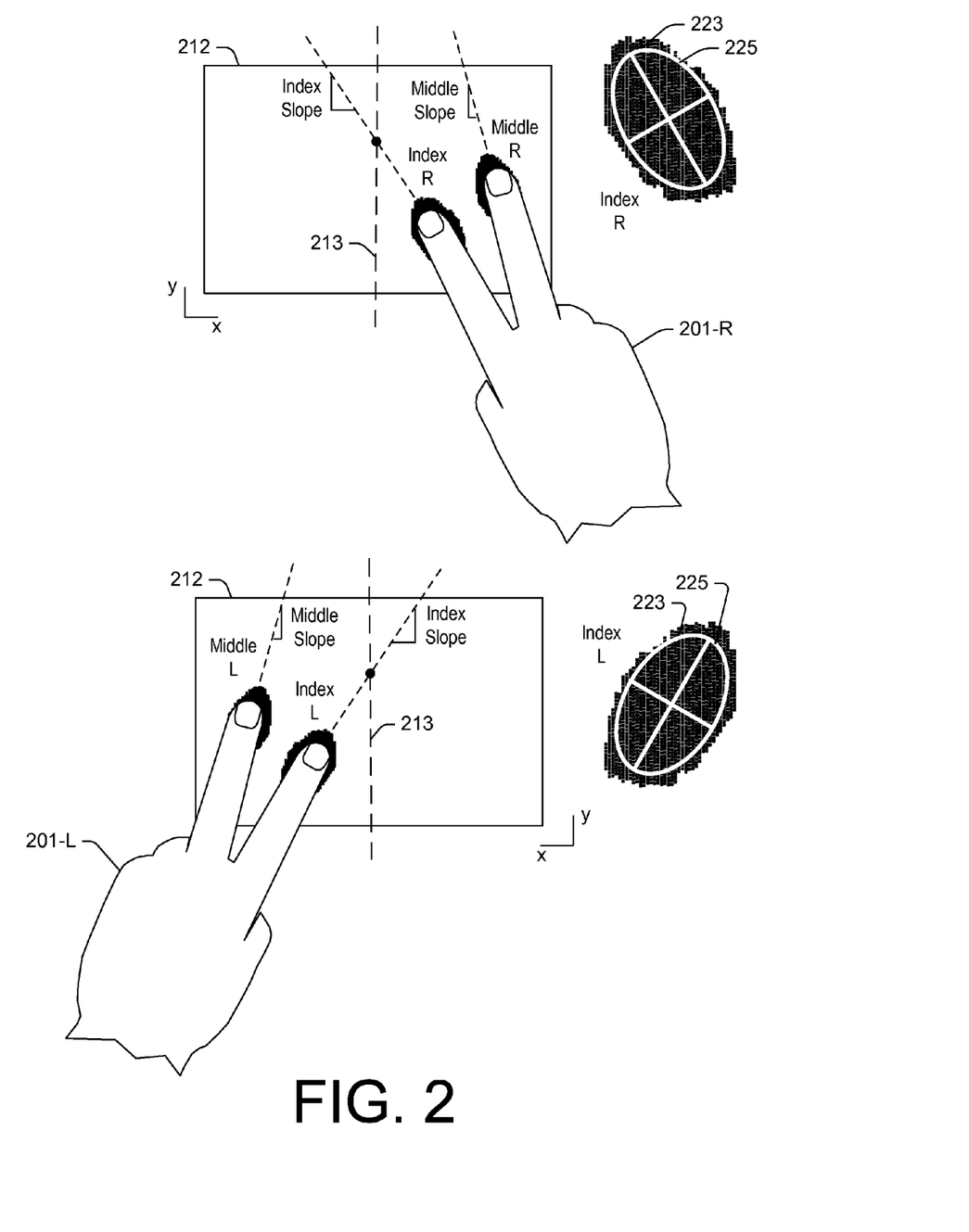
FIG. 2 is a series of diagrams of examples of techniques to determine handedness based on information.

FIG. 2 shows an example of a right hand 201-R of a user, a left hand 201-L of a user, a touch sensitive surface 212 that may be defined in part by an axis 213. For example, the axis 213 may define a left side of the touch sensitive surface 212 and a right side of the touch sensitive surface 212. As shown, a user may use an index finger and/or a middle finger of her right hand 201-R to touch the surface 212 and a user may use an index finger and/or a middle finger of her left hand 201-L to touch the surface 212. In such examples, the touches may register as being right hand touches or left hand touches.

As shown in the example of FIG. 2, information associated with touch may be a group of points 223, for example, x, y points as registered by touch sensing circuitry (e.g., an array, etc.). In such an example, the points may correspond to a sensing time, a sensing interval, etc. As an example, an algorithm may analyze information to determine one or more axes, an orientation, etc. For example, the group of points 223 may be analyzed to determine at least one axis of a geometric shape 225 such as an oval shape (e.g., a shape that may correspond to a shape of a fingertip). As an example, a method may include determining an orientation angle of a shape based at least in part on information received responsive to touch input.

As an example, an algorithm may include receiving information associated with a finger and determining a line based at least in part on the information (e.g., optionally via an oval or other shape of a fingertip). In such an example, the line may include an origin and a slope that can be used to decide if the line crosses the axis 213 (e.g., optionally with respect to one or more axial limits).

As another example, an algorithm may perform a rotation to determine whether parallel alignment of a line is achieved more readily via clockwise rotation or counter-clockwise rotation. For example, the index finger line for the right hand 201-R is more readily aligned parallel to the axis 213 via clockwise rotation; whereas, the index finger line for the left hand 201-L is more readily aligned parallel to the axis 213 via counter-clockwise rotation. In other words, if clockwise rotation for parallel alignment of a line with respect to an axis is achieved via 30 degrees of rotation and if counter-clockwise rotation for parallel alignment is achieved via 150 degrees of rotation, clockwise rotation more readily aligns the line with the axis.

As an example, a method may include receiving information associated with pointing, clicking and/or multi-touch input on a touch surface. In such an example, when a user is contacting the touch surface, the initial contact area may be extracted, which can be by one finger, multiple fingers, and/or a palm; noting that there might be multiple initial contact areas (e.g., relatively simultaneous). As shown in FIG. 2, the axis 213 may be a vertical line that defines a vertical symmetry axis that may be used for one or more analyses of received information to determine handedness (e.g., probability, etc.). As an example, a line may be associated with an initial contact area; noting that there might be multiple lines of initial contacts (e.g., relatively simultaneous touches).

Figure 3:
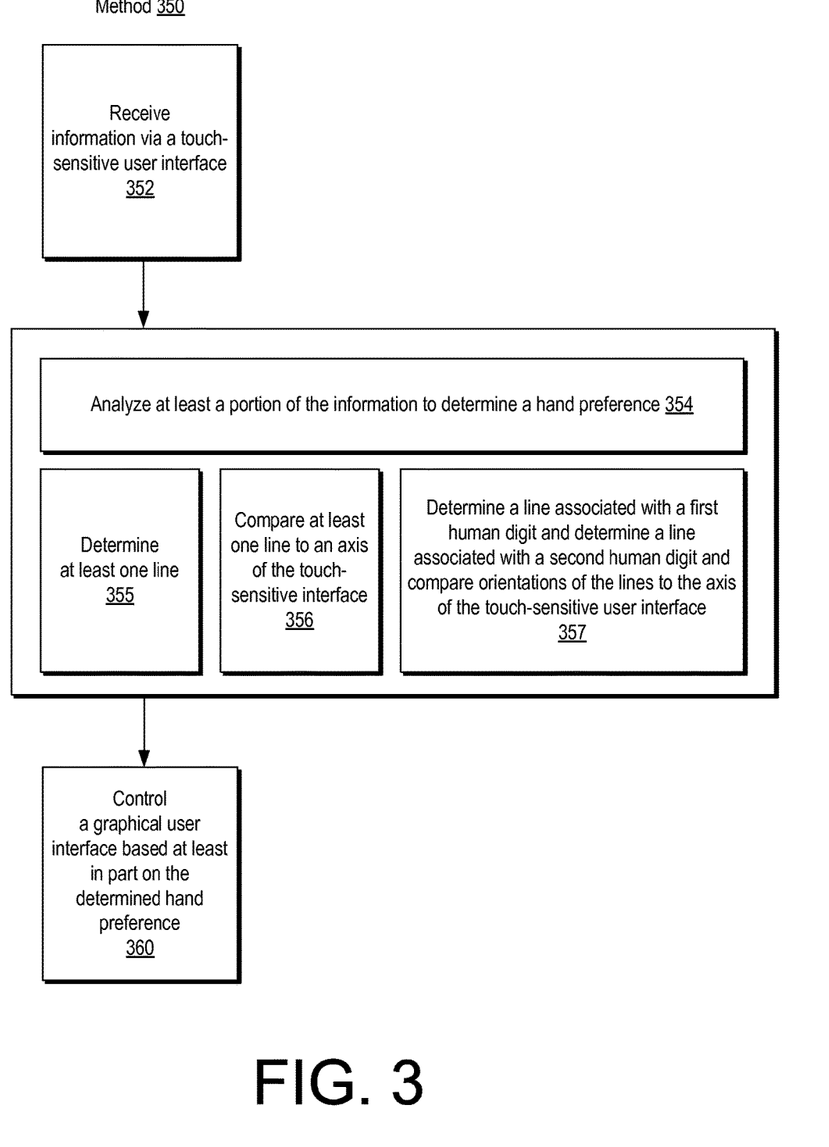
FIG. 3 is a diagram of an example of a method.

FIG. 3 shows an example of a method 350 that includes a reception block 352 for receiving information via a touch-sensitive user interface, an analysis block 354 for analyzing at least a portion of the information to determine a hand preference and a control block 360 for controlling a graphical user interface based at least in part on the determined hand preference. As shown in the example of FIG. 3, the analysis block 352 can include a determination block 355 for determining at least one line; a comparison block 356 for comparing at least one line to an axis of a touch-sensitive interface, and/or a determination block 357 for determining a line associated with a first human digit and determining a line associated with a second human digit and comparing orientations of the lines to an axis of a touch-sensitive user interface.

Figure 4:
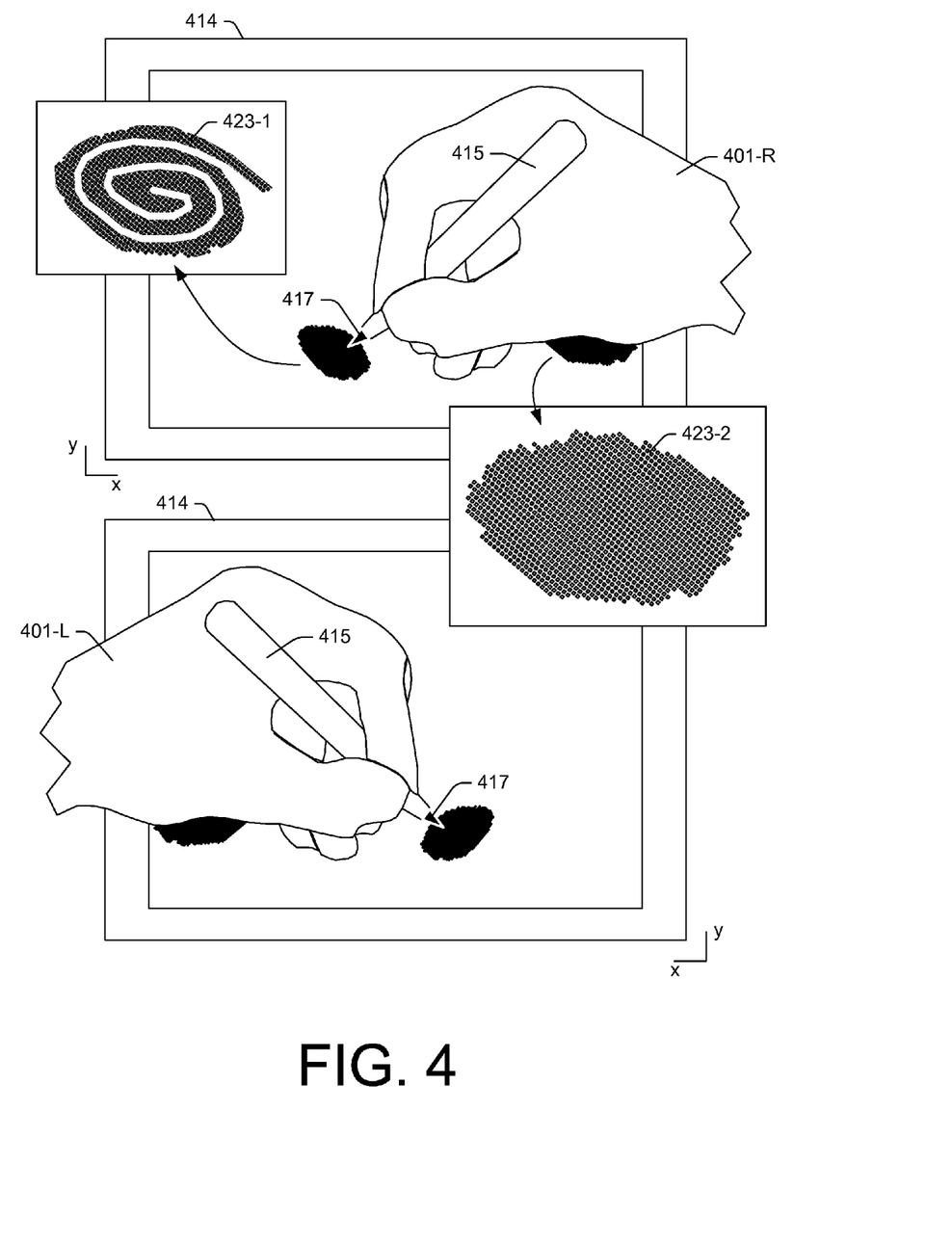
FIG. 4 is a series of diagrams of examples of techniques to determine handedness based on information.

FIG. 4 shows an example of a right hand 401-R of a user, a left hand 401-L of a user, a touch-sensitive user interface 414 and a pen 415 that includes a pen tip 417. As shown in FIG. 4, the touch-sensitive user interface 414 can register input via the hand 401-R and the pen tip 417 and via the hand 401-L and the pen tip 417.

As an example, when a user is using a stylus on a touch surface, pen contact 423-1 (e.g., pen tip contact/hover) as well as palm contact 432-2 can be extracted. As an example, if palm contact is on the right side of the pen contact, this can suggest that the user is a right handed user; otherwise, it can suggest that the user is a left handed user; and, for example, if palm contact is on the left side of the pen contact, this can suggest that the user is a left handed user; otherwise, it can suggest that the user is a right handed user. As an example, multiple contacts by a hand may be possible. As an example, an algorithm may act to classify a contact as palm contact. As an example, an algorithm may average multiple hand contact areas and use an average for purposes of a comparison with a pen contact.

As an example, where writing with a pen may include information as to handedness, such information may be analyzed. For example, as shown in FIG. 4, a spiral may be drawn with a swirl direction (e.g., clockwise or counter-clockwise). As an example, "ink" stroke direction may be information that can be analyzed to make a hand preference determination and/or to enhance a hand preference determination (e.g., as to statistical analysis, probability, etc.).

Figure 5:
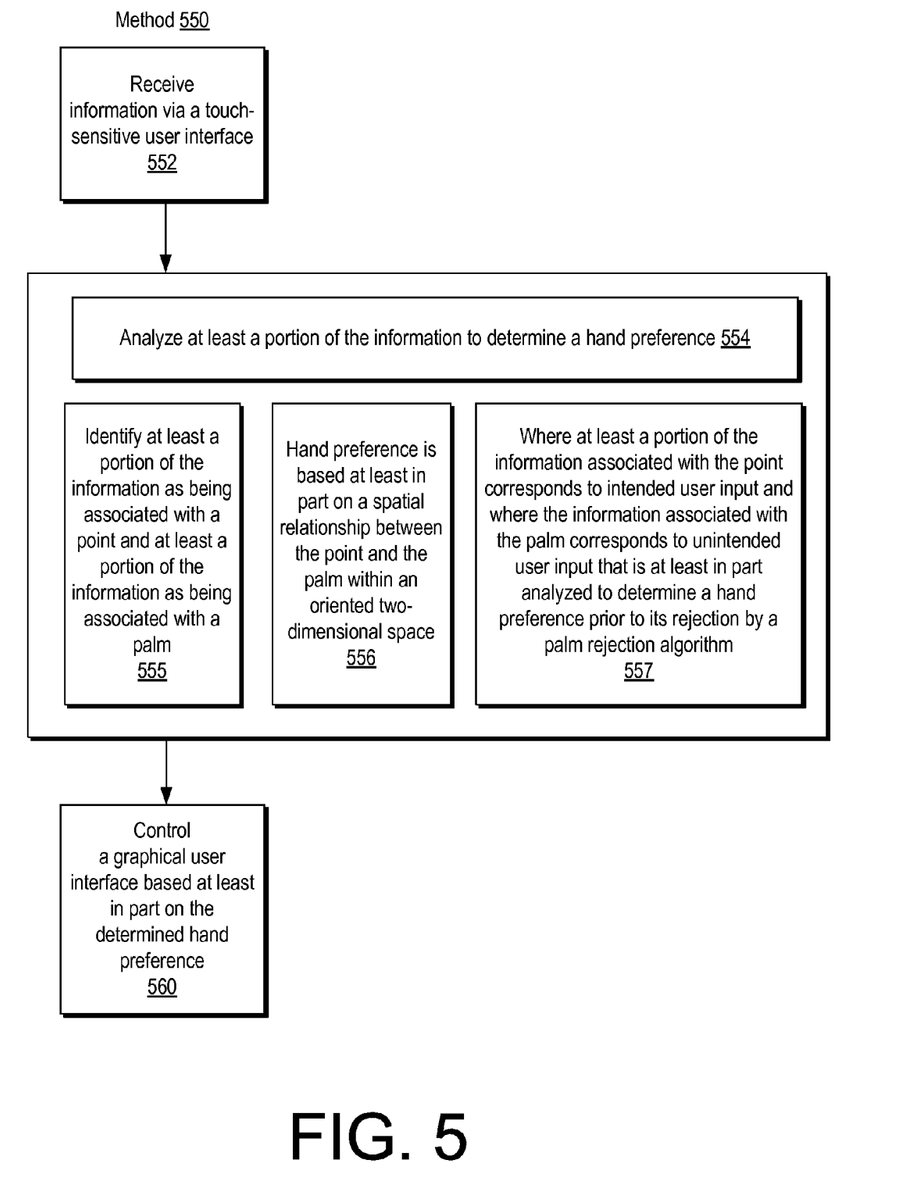
FIG. 5 is a diagram of an example of a method.

FIG. 5 shows an example of a method 550 that includes a reception block 552 for receiving information via a touch-sensitive user interface, an analysis block 554 for analyzing at least a portion of the information to determine a hand preference and a control block 560 for controlling a graphical user interface based at least in part on the determined hand preference. As shown in the example of FIG. 5, the analysis block 552 can include an identification block 555 for identifying at least a portion of information as being associated with a point and at least a portion of information as being associated with a palm, a spatial relation block 556 where hand preference is based at least in part on a spatial relationship between a point and a palm within an oriented two-dimensional space (e.g., a 2D touch screen, etc.), and a correspondence block 557 where at least a portion of information associated with a point corresponds to intended user input and where information associated with a palm corresponds to unintended user input that is at least in part analyzed to determine a hand preference prior to its rejection by a palm rejection algorithm. As to the latter, an algorithm may optionally operate on information (e.g., signals, data, etc.) prior to passing the information through a palm rejection algorithm, which may, for example, act to discard information associated with palm contact.

Figure 6:
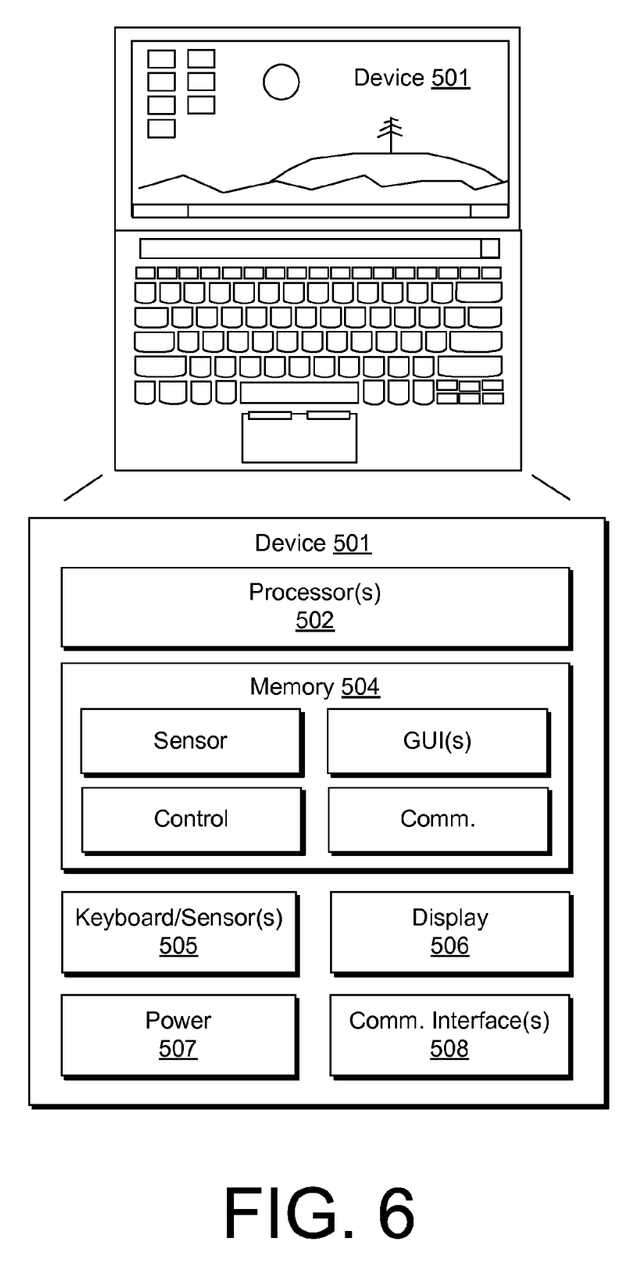
FIG. 6 is a diagram of an example of a device.

FIG. 6 shows an example of a device 601 that includes one or more processors 602 (e.g., one or more cores), memory 604, a keyboard with one or more sensors 605 (e.g., an associated touchpad, etc.), a display 606, a power supply 607 and one or more communication interfaces 608. As described herein, a communication interface may be a wired or a wireless interface. In the example of FIG. 6, the memory 604 can include one or more modules such as, for example, a sensor module, a control module, a GUI module and a communication module. Such modules may be provided in the form of instructions, for example, directly or indirectly executable by the one or more processors 602.

As an example, GUI can be rendered to a display via circuitry (e.g., a processor, which may be a graphics processor) where one or more portions of the GUI are selectable via an input mechanism such as, for example, a touch screen, a mouse, a key of a keyboard, etc. In such an example, upon selection, the GUI may issue an instruction (e.g., a command) that causes execution of code. For example, consider receipt of a touch via touch sensing circuitry at x,y coordinates of a touch screen that correspond to a control graphic of a GUI where code executes responsive to sensing of the touch to cause issuance of a command (e.g., to change one or more settings). Such input may also cause termination of the GUI (e.g., such that the GUI is no longer be rendered to the display). As an example, a GUI may be rendered to a display as a panel, optionally including a command line, for example, for entry of text, etc.

The device 601 may include or be part of a system that includes one or more of a touchpad, a touchscreen, a mouse, etc., which may be operatively coupled to the device 601. As an example, information may be received from an input mechanism and analyzed to determine, for example, handedness of a user. As an example, the device 601 may include or be part of a system that includes a video camera (e.g., a webcam), which may be configured to recognize or track user input. As an example, information received via a camera, a proximity sensor, etc. may be used to determine a hand preference (e.g., handedness of a user), optionally in conjunction with other information. As an example, the device 601 can include circuitry for automatic handedness detection and, for example, for rendering a GUI to a display to change one or more settings of the device 601 to enhance user experience with respect to detected handedness of a user of the device 601.

Figure 7:
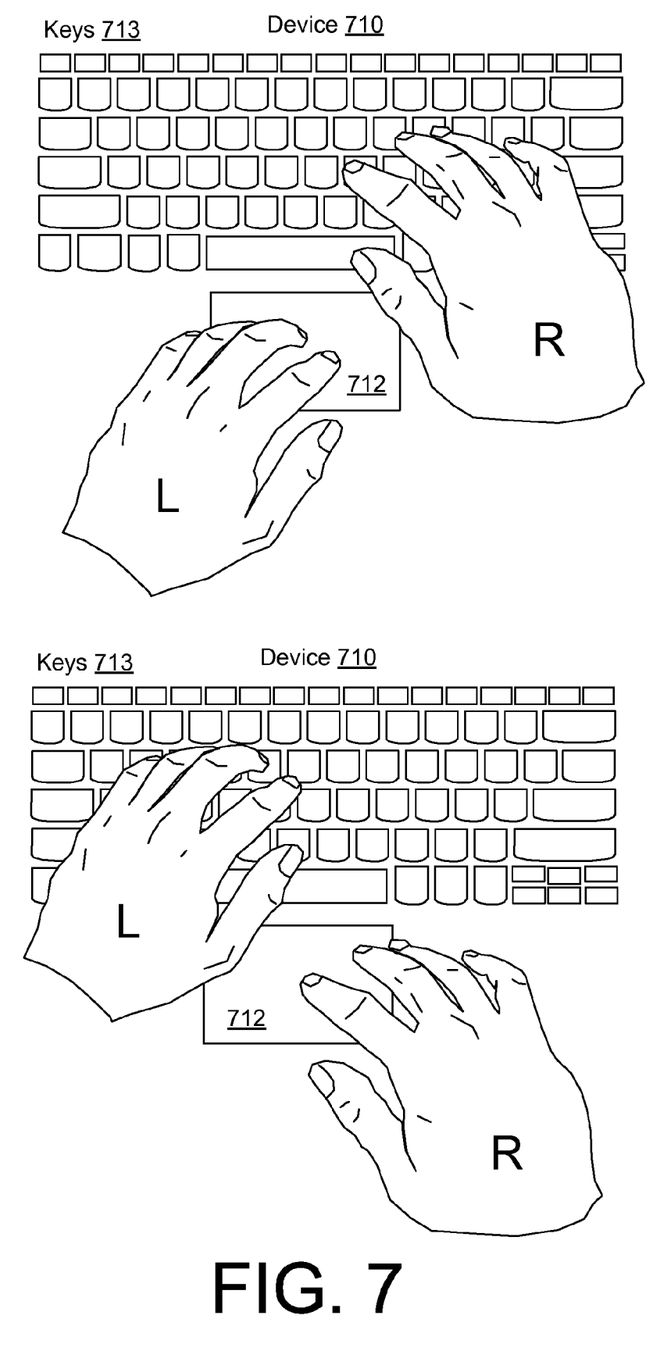
FIG. 7 is a diagram of examples of techniques to determine handedness based on information.

FIG. 7 shows an example of a device 710 that includes a touchpad 712 and keys 713. As an example, information received via one or more keys may be used to determine a hand preference (e.g., handedness detection of a user), optionally in conjunction with other information. For example, where a key input is received via one or more of the key 713 while touchpad input is received via the touchpad 712, the information may be analyzed to determine a hand preference. As an example, a time between key input and touchpad input (e.g., and/or between touchpad input and key input) may indicate that a hand has been moved from being over a keyboard to being over a touchpad (e.g., and/or moved from being over a touchpad to being over a keyboard).

Figure 8:
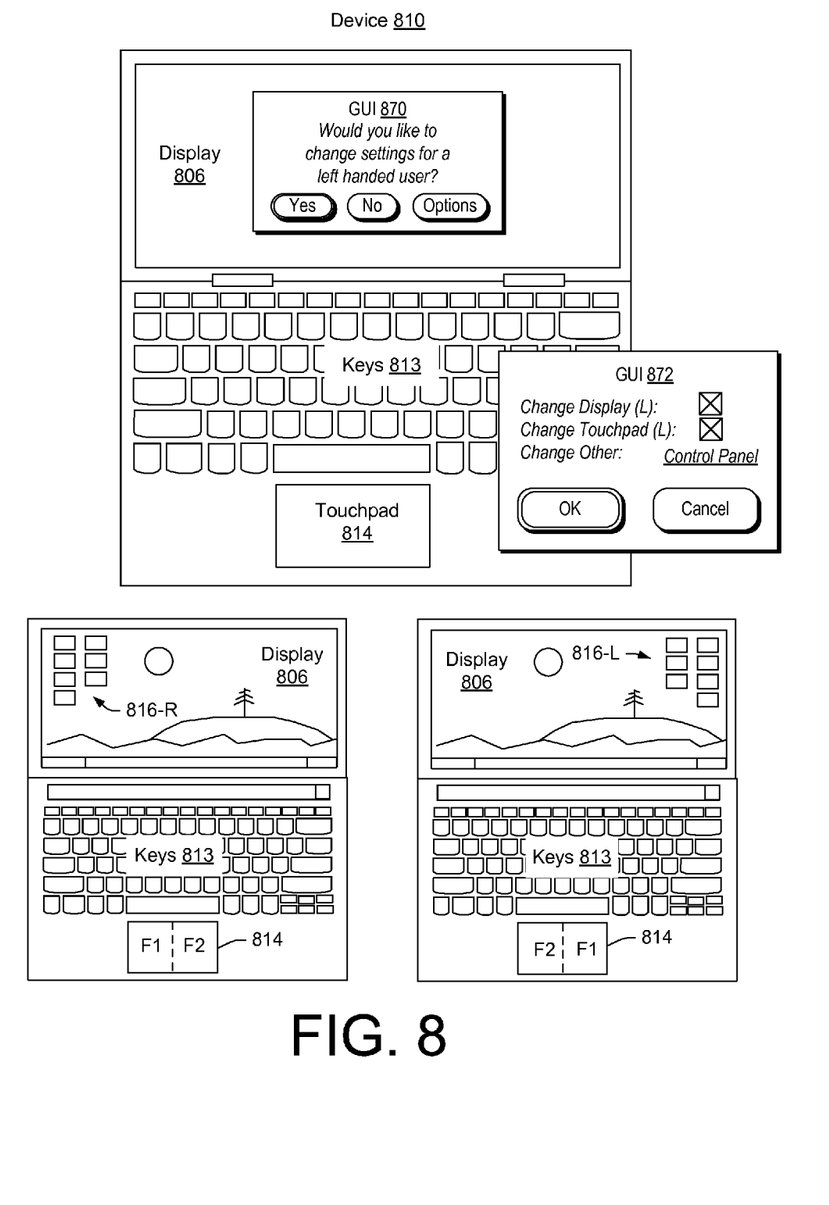
FIG. 8 is a diagram of an example of a device and examples of graphical user interfaces.

FIG. 8 shows an example of a device 810 that includes a display 806, keys 813 and a touchpad 814. In the example of FIG. 8, a graphical user interface (GUI) 870 is rendered to the display 806 that can cause a change to one or more settings associated with the device 810. For example, the GUI 870 can include a button selectable by a user to cause issuance of a command that may cause, directly or indirectly, a change to one or more parameters values associated with one or more handedness related modes of operation. As shown, the GUI 870 includes a "Yes" button and a "No" button where selection of the "Yes" button may change one or more settings of the device 810 for a left handed user and where selection of the "No" button may cause the GUI 870 to retreat (e.g., no longer be rendered to the display 806).

As an example, a GUI may include a graphical control as to options, for example, particular modes of operation that may be changed to enhance user experience as to handedness. For example, the GUI 870 also includes an "Options" button that may be selected to cause a GUI 872 to be rendered to the display 806. As shown, the GUI 872 includes options and check boxes as well as a link that may be selected to cause a control panel (e.g., or other panel) to be rendered to the display 806.

As an example, an operating system may provide for changing one or more parameter values for an input mechanism (e.g., a mouse, a touchpad, a button or buttons, icons, etc.). As an example, in a WINDOWS® OS, a method to change one or more mouse properties (e.g., parameter values or settings) can include:

(i) Opening "Mouse Properties" by clicking the "Start" button picture of the "Start" button (e.g., a start button control graphic);

(ii) Clicking "Control Panel" (e.g., as a menu item of a GUI);

(iii) In a search box, typing "mouse" (e.g., as part of a command line interface of a GUI);

(iv) Clicking "Mouse" (e.g., as a menu item of a GUI);

(v) Clicking the "Buttons" tab (e.g., as a tab control graphic of a GUI); and (vi) To swap the functions of the right and left mouse buttons, under "Button" configuration, select the "Switch" primary (e.g., primary click button for normal select and normal drag) and secondary (e.g., secondary click button for context menu and special drag) buttons check box (e.g., or select a "Right-handed" radio button or a "Left-handed" radio button, etc., as in the WINDOWS® 7 OS).

Thus, to switch primary and secondary buttons of a mouse (e.g., or other input mechanism such as a touchpad, which may include one or more "button" regions), a user may need to perform a series of actions, which may not be intuitive and require reference to a help manual. As an example, to improve user experience, a method may receive information and analyzes at least a portion of that information to determine a hand preference and, depending on the determined hand preference (e.g., and one or more current settings), control a graphical user interface (GUI) that allows for expeditiously changing one or more parameter values, for example, to switch primary button and secondary button functions. In such an example, a GUI may also make a user aware of various options that can enhance usability of a device with respect to handedness.

As an example, information may be rendered to the display 806 for a right hand mode or for a left hand mode. For example, in a right hand mode, icons 816-R may be rendered to the left side of the display 806; whereas, in a left hand mode, icons 816-L may be rendered to the right side of the display 806. As an example, the touchpad 815 may include regions with associated functions such as functions F1 and F2. In such an example, a change in handedness mode may cause a function of a region or functions of regions of a touchpad to be changed (e.g., F1 on the left and F2 on the right for a right hand mode and F2 on the left and F1 on the right for a left hand mode). As an example, a touchpad assembly may include one or more buttons that may be depressible and/or otherwise configured to respond to touch.

As an example, a method may include rendering a GUI that includes one or more options as to settings for modes of operation related to handedness. For example, consider a GUI that includes an option to change a mode of displaying information such as icons to a display, an option to change a mode of arranging functions with respect to a touch sensitive surface, etc. In such an example, a user may select one or more of the options to coincide with one or more of the user's handedness preferences. As an example, a GUI may include one or more check boxes or other graphical controls that can, upon selection, issue commands (e.g., instructions, etc.) to change one or more parameter values for modes of operation that can enhance user experience with respect to handedness preference(s).

As an example, an algorithm to determine handedness of a user may operate in real-time. As an example, an algorithm to determine handedness of a user may operate on information that has been stored to memory. For example, upon start-up (e.g., restart, etc.), a device may analyze stored information and make a decision as to whether or not to render a graphical user interface to a display to facilitate changing one or more settings associated with handedness. As an example, a method may implement a threshold, which may be set to a default value, be adjustable, etc. As an example, a threshold may be set to a percentage value "X %" such that when "X %" of the information in a period of time suggests that user is a left-handed user (e.g., left handed outcome), the method determines that user is a left handed user.

As an example, a method can include receiving information via a touch-sensitive user interface; analyzing at least a portion of the information to determine a hand preference; and controlling a graphical user interface based at least in part on the determined hand preference. In such an example, the determined hand preference can be left handed and controlling the graphical user interface can include rendering the graphical user interface to a display where the graphical user interface includes a control graphic (e.g., a graphical control) that changes one or more input mechanism settings of at least the touch-sensitive user interface. For example, the control graphic may be configured to issue an instruction (e.g., a command) that acts to change one or more parameter values. Such a control graphic may respond to receipt of input, optionally via the touch-sensitive user interface and/or other interface.

As an example, a method can include receiving information for a period of operational time of a touch-sensitive user interface, for example, where the period of operational time exceeds about one minute. As an example, information may be received over a number of uses (e.g., sessions), a number of interactions, etc. As an example, control of a GUI may occur at a time of start-up, resume, etc., for example, where a user may be accustomed to pop-ups (e.g., GUIs) as to options such as updates, etc. (e.g., consider software update pop-ups, etc.).

As an example, a method can include analyzing at least a portion of information to determine a hand preference by performing a statistical analysis that determines a probability of the hand preference. As an example, a statistical analysis may include a confidence level analysis. For example, a method can include performing "experiments" until a desired level of confidence is achieved (e.g., consider an 80% level, a 90% level, etc.). In such a manner, a user may not be "disturbed" unless there is some degree of certainty (e.g., degree of likelihood, etc.) that the user may benefit from one or more proposed changes (e.g., change options that may enhance usability with respect to a determined hand preference).

As an example, a touch-sensitive user interface can include an electronic digitizer interface that operates in conjunction with a stylus (e.g., a pen, etc.). As an example, a touch-sensitive user interface can include a touchscreen that operates in conjunction with human touch. As an example, a touch-sensitive interface may include circuitry for stylus and human touch. As an example, a method may analyze stylus input information and human touch input information to determine a hand preference.

As an example, a method can include analyzing at least a portion of information by determining at least one line. In such an example, a touch-sensitive user interface can include an axis and analyzing can include comparing the at least one line to the axis. In such an example, the method can include determining a line associated with a first human digit and determining a line associated with a second human digit and comparing orientations of the lines to the axis of the touch-sensitive user interface.

As an example, a method can include identifying at least a portion of information as being associated with a point and at least a portion of information as being associated with a palm. In such an example, a touch-sensitive user interface can include an oriented two-dimensional space where a hand preference is based at least in part on a spatial relationship between the point and the palm within the oriented two-dimensional space.

As an example, a method can include receiving information where a portion of the information is associated with a point and corresponds to intended user input and where a portion of the information is associated with a palm and corresponds to unintended user input. In such an example, the unintended user input may be at least in part analyzed to determine a hand preference prior to its rejection by a palm rejection algorithm.

As an example, a method can include controlling a graphical user interface based at least in part on historical control information where the historical control information can include an indicator that indicates a prior determination of a left hand preference. For example, if a device receives an input that changes one or more settings for left hand preference, the device may terminate one or more portions of an algorithm or algorithms associated with the changed one or more settings. In such an example, one or more background processes may be terminated. In other words, a "lifetime" of a method may last for a period of time, for example, less than a first week of use, less than a first month of use, etc. of a device by a user. A short "lifetime" that makes decisions within an initial window of use of a device may facilitate the user's adaptation to the device; compared to a process that may act after a user has become well-accustomed to a device (e.g., where a left handed user has adapted to right handed operations).

As an example, a method may include disabling analyzing information based at least in part on a determined right hand preference.

As an example, a method can include controlling a graphical user interface based at least in part on a determined hand preference by rendering to a display a graphical user interface that includes graphical controls for controlling orientation of information rendered to the display.

as an example, a device can include a processor; memory operatively coupled to the processor; a display operatively coupled to the processor; a touch-sensitive user interface operatively coupled to the processor; and circuitry that receives information via the touch-sensitive user interface, analyzes at least a portion of the information to determine a hand preference, and controls rendering of a graphical user interface to the display based at least in part on the determined hand preference. In such an example, the touch-sensitive user interface can include electronic digitizer circuitry and/or capacitive touch circuitry.

As an example, one or more machine-readable storage media can include processor-executable instructions that comprise instructions to instruct a device to perform operations including: receiving information via the touch-sensitive user interface, analyzing at least a portion of the information to determine a hand preference, and controlling rendering of a graphical user interface to a display based at least in part on the determined hand preference. In such an example, one or more machine-readable storage media can include processor-executable instructions to call for rendering of the graphical user interface to the display for a determined left hand preference and to terminate the analyzing and to call for disabling rendering of the graphical user interface to the display for a determined right hand preference and to terminate the analyzing.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium or a machine-readable medium may be a storage device (e.g., a memory card, a storage disk, etc.) and referred to as a computer-readable storage medium or a machine-readable storage medium that is not a carrier wave (e.g., a non-transitory medium).

Figure 9:
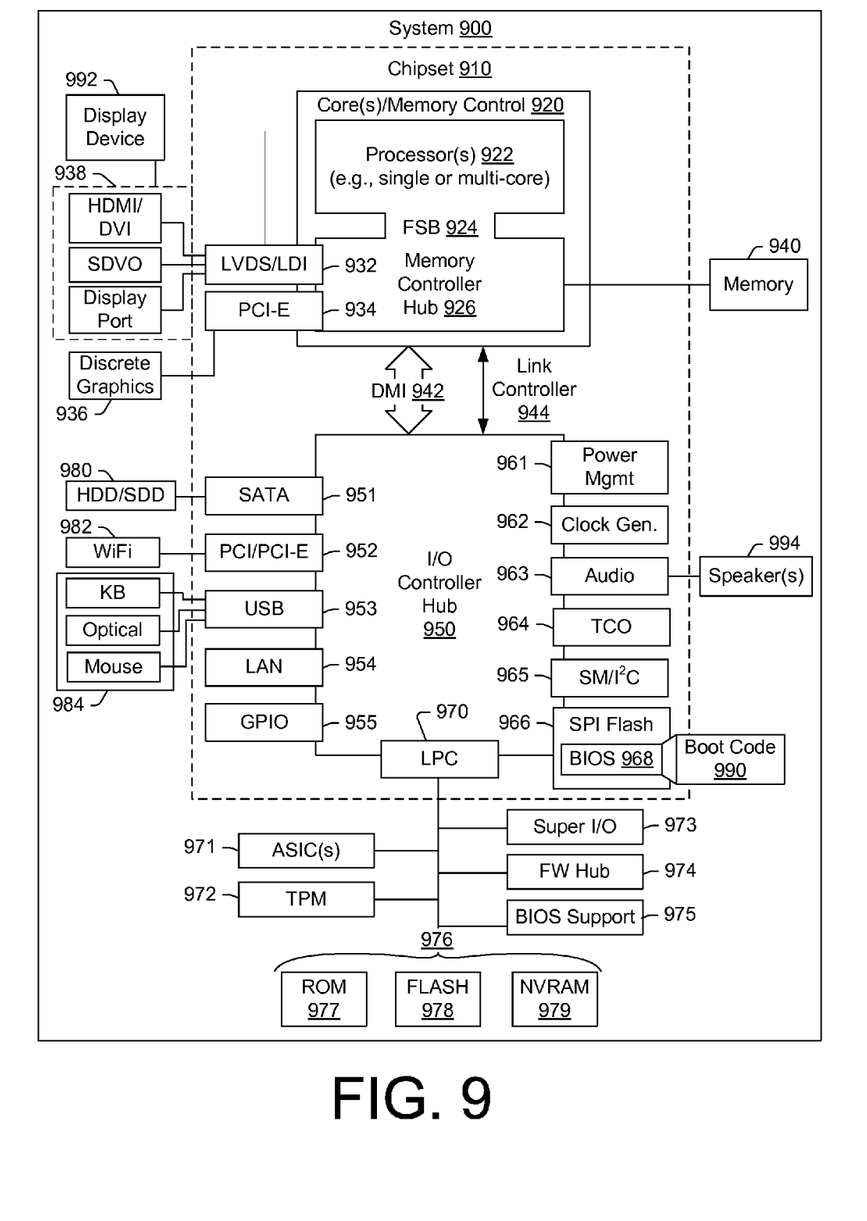
FIG. 9 is a diagram of examples of components.

While various examples of circuits or circuitry have been discussed, FIG. 9 depicts a block diagram of an illustrative computer system 900. As an example, the system 900 may be a system of components that may be included in a device. The system 900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 900. As described herein, a device such as the device 601 may include at least some of the features of the system 900.

As shown in FIG. 9, the system 900 includes a so-called chipset 910. A chipset refers to a group of integrated circuits, or chips, that are designed to work together. Chipsets are usually marketed as a single product (e.g., consider chipsets marketed under the brands INTEL®, AMD®, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture. As an example, a chipset may be configured as a platform controller hub (PCH), for example, the memory controller hub (MCH) 926 may be considered a northbridge and the I/O controller hub (ICH) 950 may be considered a southbridge where the MCH 926 and the ICH 950 may be components of the platform controller hub (PCH) (e.g., a PCH architecture).

As shown in FIG. 9, the memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory". As an example, one or more processors may include circuitry for memory access, for example, to access system memory.

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (×16) PCI-E port for an external PCI-E-based graphics card. A system may include AGP or PCI-E for support of graphics (e.g., rendering of graphics to a display, etc.).

The I/O controller hub 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O controller hub 950 may include integrated gigabit Ethernet controller lines multiplexed with a PCI-E interface port. Other network features may operate independent of a PCI-E interface.

The interfaces of the I/O controller hub 950 provide for communication with various devices, networks, etc. For example, the SATA interface 951 provides for reading, writing or reading and writing information on one or more drives 980 such as HDDs, SDDs or a combination thereof. The I/O controller hub 950 may also include an advanced host controller interface (AHCI) to support one or more drives 980. The PCI-E interface 952 allows for wireless connections 982 to devices, networks, etc. The USB interface 953 provides for input devices 984 such as keyboards (KB), one or more optical sensors, a touchpad, mice and various other devices (e.g., cameras, phones, storage, media players, etc.). On or more other types of sensors may optionally rely on the USB interface 953 or another interface (e.g., I²C, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979. With respect to the TPM 972, this module may be in the form of a chip that can be used to authenticate software and hardware devices. For example, a TPM may be capable of performing platform authentication and may be used to verify that a system seeking access is the expected system.

The system 900, upon power on, may be configured to execute boot code 990 for the BIOS 968, as stored within the SPI Flash 966, and thereafter processes data under the control of one or more operating systems and application software (e.g., stored in system memory 940). An operating system may be stored in any of a variety of locations and accessed, for example, according to instructions of the BIOS 968. Again, as described herein, a satellite, a base, a server or other machine may include fewer or more features than shown in the system 900 of FIG. 9.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
   receiving information via a touch-sensitive user interface that comprises an axis;
   based at least in part on the information, determining a first line associated with a first human digit, determining a second line associated with a second human digit and comparing orientations of the first and second lines to the axis of the touch-sensitive user interface to determine a hand preference; and
   wherein the hand preference is left handed, rendering a user interface to a display that comprises a control that changes one or more input mechanism settings of at least the touch-sensitive user interface.

2. The method of claim 1 wherein the receiving information comprises receiving information for a period of operational time of the touch-sensitive user interface wherein the period of operational time exceeds one minute.

3. The method of claim 1 wherein to determine a hand preference comprises performing a statistical analysis that determines a probability of the hand preference.

4. The method of claim 1 wherein the touch-sensitive user interface comprises an electronic digitizer interface that operates in conjunction with a stylus.

5. The method of claim 1 wherein the touch-sensitive user interface comprises a touchscreen that operates in conjunction with human touch.

6. The method of claim 1 comprising controlling the user interface based at least in part on historical control information wherein the historical control information comprises an indicator that indicates a prior determination of a left hand preference.

7. The method of claim 1 comprising disabling the determining a first line associated with a first human digit and the determining a second line associated with a second human digit based at least in part on a determined right hand preference.

8. The method of claim 1 comprising rendering to the display a user interface that comprises controls for controlling orientation of information rendered to the display.

9. The method of claim 1 wherein to determine a hand preference is based at least in part on a probability of an individual being left handed or a probability of an individual being right handed wherein the probability of an individual being left handed is less than the probability of an individual being right handed.

10. A device comprising:
    a processor;
    memory operatively coupled to the processor;
    a display operatively coupled to the processor;
    a touch-sensitive user interface operatively coupled to the processor wherein the touch-sensitive user interface comprises an axis; and
    circuitry that
       receives information via the touch-sensitive user interface,
       based at least in part on the information, determines a first line associated with a first human digit, determines a second line associated with a second human digit and compares orientations of the first and second lines to the axis of the touch-sensitive user interface to determine a hand preference, and
       wherein the hand preference is left handed, controls rendering of a user interface to the display that comprises a control that changes one or more input mechanism settings of at least the touch-sensitive user interface.

11. The device of claim 10 wherein the touch-sensitive user interface comprises electronic digitizer circuitry.

12. The device of claim 10 wherein the touch-sensitive user interface comprises capacitive touch circuitry.

13. The system of claim 10, wherein to determine a hand preference is based at least in part on a probability of an individual being left handed or a probability of an individual being right handed wherein the probability of an individual being left handed is less than the probability of an individual being right handed.

14. The system of claim 10 comprising circuitry that, based at least in part on a determined right hand preference, disables the circuitry that determines a first line associated with a first human digit, determines a second line associated with a second human digit and compares orientations of the first and second lines to the axis of the touch-sensitive user interface to determine a hand preference.

15. A device comprising:
a processor;
memory operatively coupled to the processor;
a display operatively coupled to the processor;
a touch-sensitive user interface operatively coupled to the processor wherein the touch-sensitive user interface comprises an oriented two-dimensional space; and
circuitry that
receives information via a touch-sensitive user interface;
based at least in part on the information, determines a hand preference via a spatial relationship between a point and a palm within the oriented two-dimensional space; and
wherein the determined hand preference is left handed, renders a user interface to the display that comprises a control that changes one or more input mechanism settings of at least the touch-sensitive user interface.

16. The system of claim 15 wherein at least a portion of the information associated with the point corresponds to intended user input and wherein information associated with the palm corresponds to unintended user input that is at least in part utilized to determine the hand preference prior to its rejection by a palm rejection algorithm.

17. The system of claim 15 comprising circuitry that, based at least in part on a determined right hand preference, disables the circuitry that determines a hand preference via a spatial relationship between a point and a palm within the oriented two-dimensional space.

18. The system of claim 15 comprising circuitry that renders to the display a user interface that comprises controls that control orientation of information rendered to the display.

19. A device comprising:
a processor;
memory operatively coupled to the processor;
a display operatively coupled to the processor;
a touch-sensitive user interface operatively coupled to the processor; and
circuitry that
receives information via a touch-sensitive user interface;
based at least in part on the information, determines a hand preference via a point and a palm wherein at least a portion of the information associated with the point corresponds to intended user input and wherein information associated with the palm corresponds to unintended user input that is at least in part utilized to determine the hand preference prior to its rejection by a palm rejection algorithm; and
wherein the determined hand preference is left handed, renders a user interface to the display that comprises a control that changes one or more input mechanism settings of at least the touch-sensitive user interface.

20. The system of claim 19 comprising circuitry that, based at least in part on a determined right hand preference, disables the circuitry that determines a hand preference via a point and a palm.

21. The system of claim 19 comprising circuitry that renders to the display a user interface that comprises controls that control orientation of information rendered to the display.

\* \* \* \* \*